United States Patent
Takahashi

(10) Patent No.: US 8,681,452 B2
(45) Date of Patent: Mar. 25, 2014

(54) LIBRARY DEVICE

(75) Inventor: Katsuji Takahashi, Tokyo (JP)

(73) Assignee: NEC Embedded Products, Ltd., Tokyo (JP)

( * ) Notice: Subject to any disclaimer, the term of this patent is extended or adjusted under 35 U.S.C. 154(b) by 0 days.

(21) Appl. No.: 13/876,308

(22) PCT Filed: Jun. 15, 2011

(86) PCT No.: PCT/JP2011/063685
§ 371 (c)(1),
(2), (4) Date: Mar. 27, 2013

(87) PCT Pub. No.: WO2012/042982
PCT Pub. Date: Apr. 5, 2012

(65) Prior Publication Data
US 2013/0201810 A1    Aug. 8, 2013

(30) Foreign Application Priority Data
Sep. 28, 2010  (JP) .................................. 2010-217896

(51) Int. Cl.
*G11B 15/68*    (2006.01)

(52) U.S. Cl.
USPC ........................................................ 360/92.1

(58) Field of Classification Search
USPC ........................................................ 360/92.1
See application file for complete search history.

(56) References Cited

U.S. PATENT DOCUMENTS

| 5,442,500 A * | 8/1995 | Hidano et al. ............... 360/92.1 |
| 6,175,466 B1 * | 1/2001 | Hori et al. .................... 360/92.1 |
| 6,580,582 B1 | 6/2003 | Caverly |
| 2005/0162772 A1 | 7/2005 | Masuda |

(Continued)

FOREIGN PATENT DOCUMENTS

| JP | 10-255372 A | 9/1998 |
| JP | 2001-126352 A | 5/2001 |
| JP | 2005-209282 A | 8/2005 |
| JP | 2009-230839 A | 10/2009 |

OTHER PUBLICATIONS

International Search Report for PCT/JP2011/063685 dated Sep. 20, 2011.

(Continued)

*Primary Examiner* — Mark Blouin
(74) *Attorney, Agent, or Firm* — Sughrue Mion, PLLC

(57) ABSTRACT

Provided is a library device configured to comprise a magazine capable of containing a plurality of cartridges and a housing capable of containing the magazine in a two-tier manner, wherein: the housing is provided, in its inside, with an accessor comprising a picker unit for holding the cartridge and a base unit for moving the picker unit in the direction of insertion and drawing of the magazine and in the direction of tier arrangement; the magazine has a step member with a step formed therein; the housing has a locking member comprising a stopper part, which is disposed in a rotatable manner and positioned to abut the step, and a releasing part, and the housing has also a biasing member for biasing the stopper part in the direction of the step member; and, in accordance with movement of the picker and base units in the direction of drawing the magazine and movement of said picker unit in the direction of magazine-tier arrangement, unlocking of the upper-tier magazine, that of the lower-tier magazine or that of both of the magazines contained respectively in the upper and lower tiers is performed.

20 Claims, 6 Drawing Sheets

(56) References Cited

U.S. PATENT DOCUMENTS

2005/0275965 A1* 12/2005 Herring et al. .................. 360/92
2008/0278847 A1* 11/2008 Barkley et al. ............... 360/92.1
2009/0242498 A1   10/2009 Suzuki et al.

OTHER PUBLICATIONS

Office Action issued by Japanese Patent Office in Japanese Application No. 2010-217896 mailed Feb. 4, 2014.

* cited by examiner

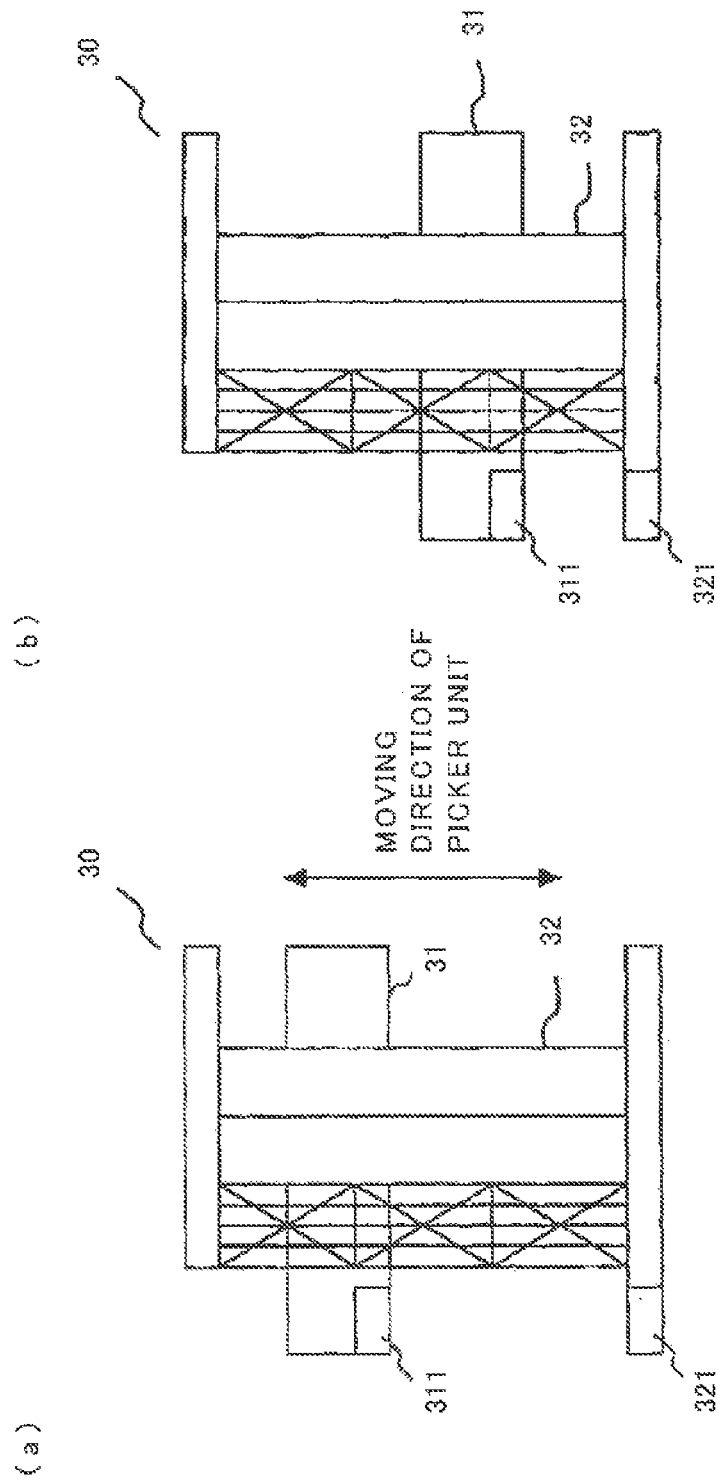

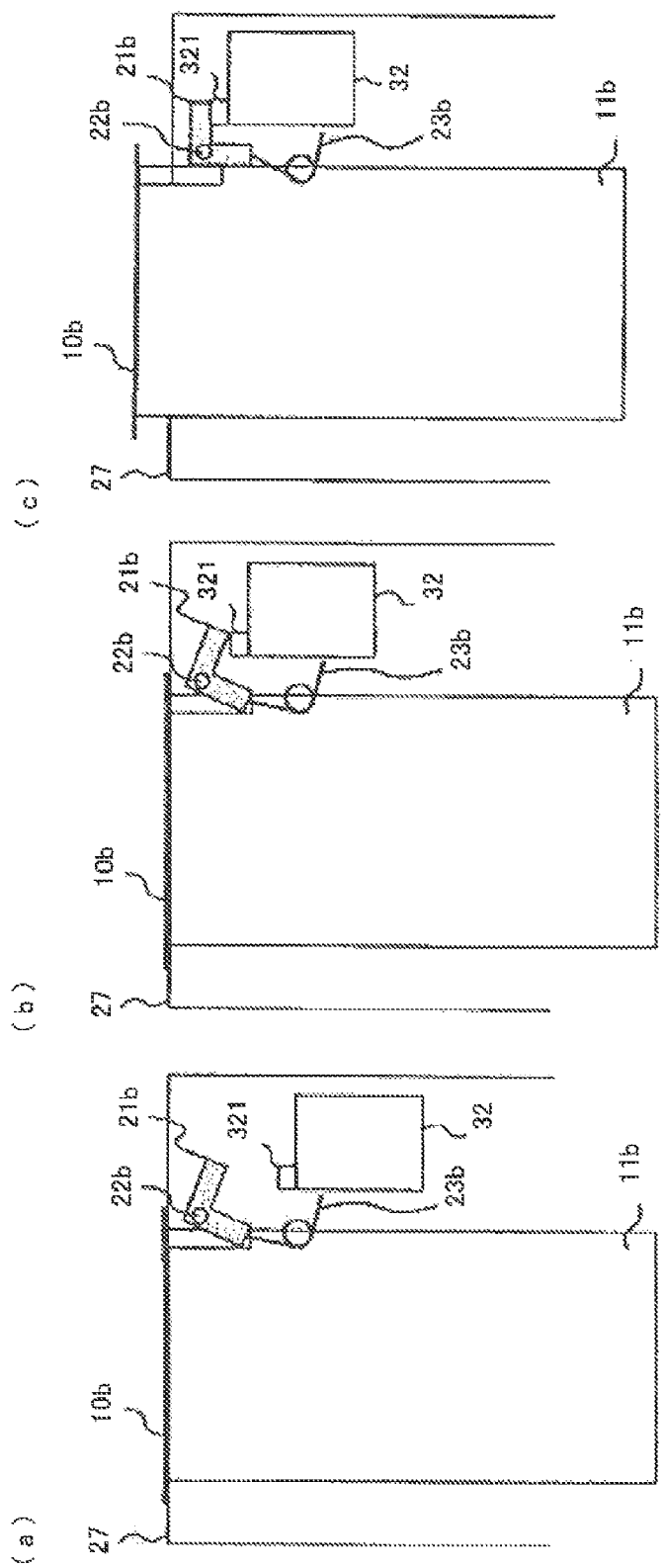

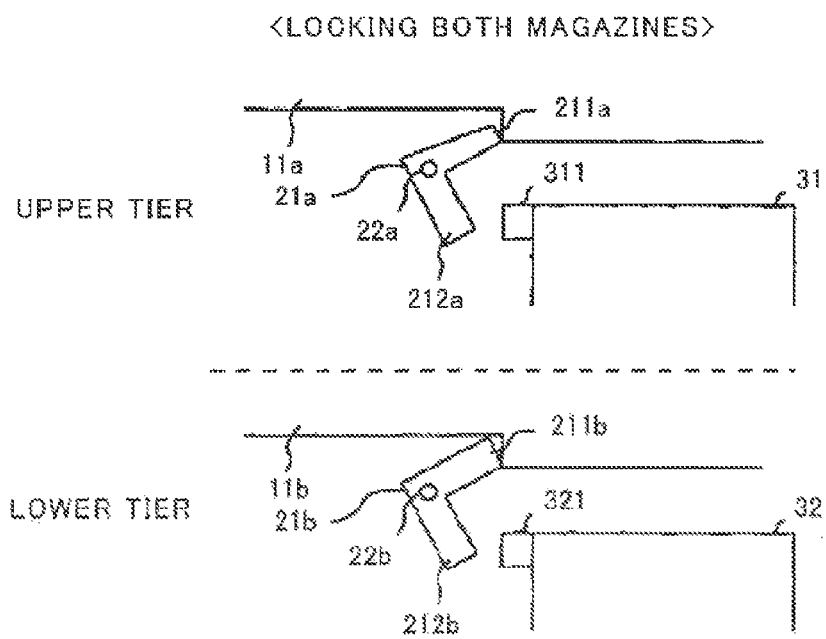
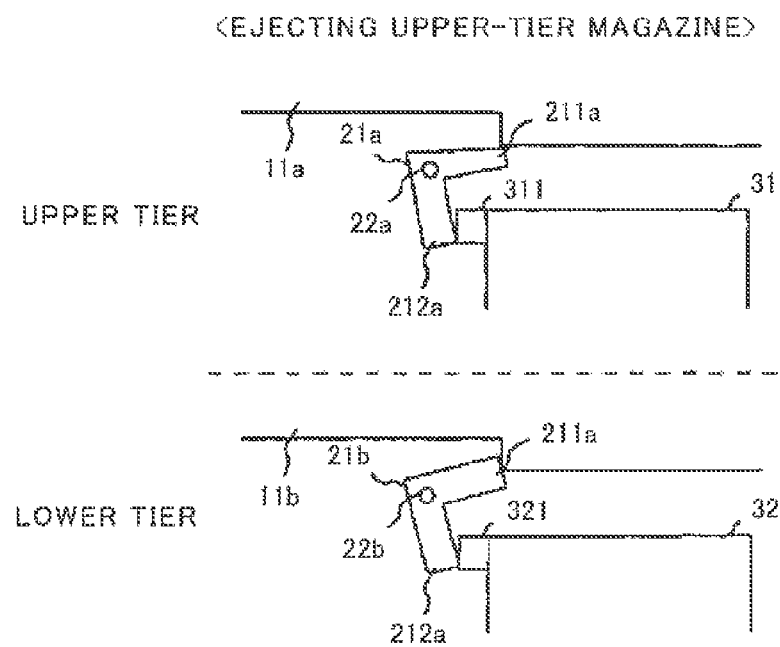

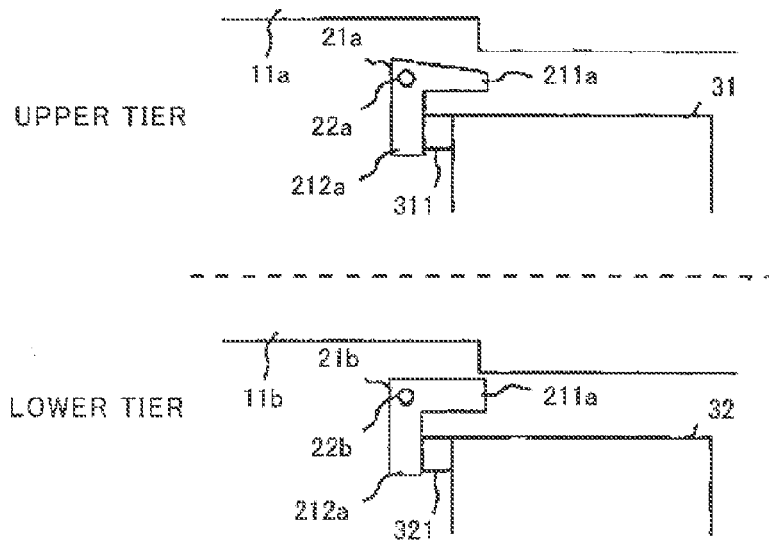
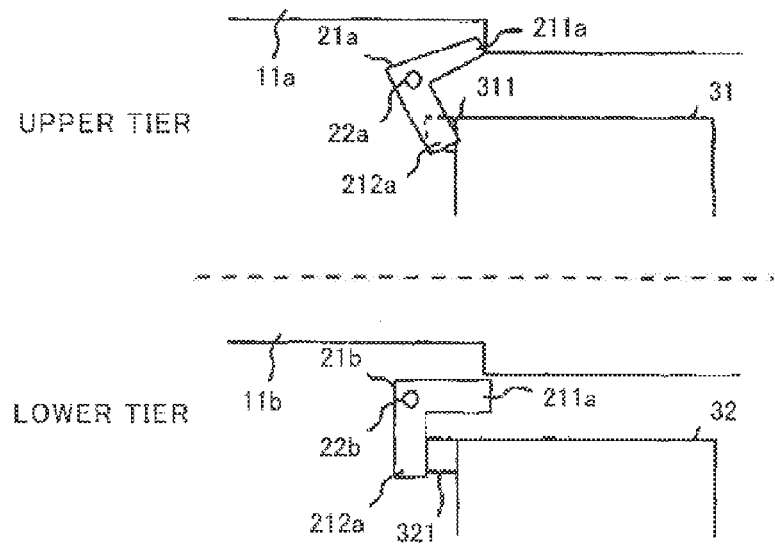

LIBRARY DEVICE

CROSS REFERENCE TO RELATED APPLICATIONS

This application is a National Stage of International Application No. PCT/JP2011/063685 filed Jun. 15, 2011, claiming priority based on Japanese Patent Application No. 2010-217896 filed Sep. 28, 2010, the contents of all of which are incorporated herein by reference in their entirety.

TECHNICAL FIELD

The present invention relates to a library device, and in particular, relates to a technology preferably applied to a library device which can contain in a two-tier manner a magazine capable of containing a plurality of cartridges each provided with a recording medium built-in therein.

BACKGROUND ART

Today, for the purpose of storing programs and data used by a computer with high reliability, a tape library device and a disk library device are utilized. In general, a library device comprises a member referred to as a magazine, which contains a plurality of cartridges (recording media, each of which is, in the case of a tape library device, one with a magnetic tape integrated with a reel), and a conveying device referred to as an accessor.

The magazine is partitioned into a plurality of cells inside, and each of the cells is configured to be able to contain one magazine. The accessor performs operation of extracting a cartridge contained in an arbitrary cell of an arbitrary magazine and setting it to a drive device, and operation of storing a cartridge extracted from the drive device into an arbitrary cell of an arbitrary magazine.

In such a library device, in the case of exchanging or charging a cartridge of only part of cells in a magazine, it is possible to extract a cartridge from such a cell or to charge a new cartridge to the cell by drawing out the magazine to the position of the cell. On the other hand, the device is configured also such that a magazine can be wholly drawn out from the device, and it is thus possible to take a magazine itself out of the device or to charge another magazine into the device.

In terms of such drawing of a magazine from a library device, for example, Patent Document 1 discloses a library device which makes it possible to release (draw) a tray in a stepwise manner by setting a mode of wholly releasing a tray and a mail slot mode of releasing a tray halfway.

Further, Patent Document 2 discloses a library device comprising a magazine holding structure which can change the draw amount of a magazine in a stepwise manner with a a simple mechanism with a reduced number of constituent parts. In the library device, a magazine has a rail comprising a plurality of steps in its bottom surface, and the main body of the device has a locking lever which is rotatable within the same plane as that of the bottom surface of the magazine, a spring which biases the locking lever in the direction of the magazine, and an accessor which can move past the side of the magazine in the direction of insertion and drawing. The engagement between the locking lever and the step is released with respect to each of steps by the rotation of the lock lever in the direction opposite to that of the spring's biasing. Thereby stepwise drawing of a magazine is made possible.

CITATION LIST

Patent Document

Patent Document 1: Japanese Patent Application Laid-Open No. 1998-255372
Patent Document 2: Japanese Patent Application Laid-Open No. 2009-230839

SUMMARY OF INVENTION

Technical Problem

The library device disclosed in Patent Document 1 employs a dedicated actuator for sending a magazine out of the device. Accordingly, not only the increased number of constituent parts but also a dedicated control circuit is necessary. Consequently the production cost for the device becomes high. Further, the number of moving parts in the device increases, and the moving parts may be a cause of malfunction and has thus been a chief cause of decrease in reliability and durability of the device.

The library device disclosed in Patent Document 2 can change the draw amount of a magazine in a stepwise manner by a simple mechanism with a reduced number of constituent parts, and can thus realize cost reduction. However, in the library device, unlocking operation performed by an accessor is with respect to only one magazine. Because of this, in a case the device contains magazines in a two-tier manner, it is necessary to firstly unlock either of the two magazines and subsequently unlock the other magazine. Hence, it is impossible to unlock both of the two magazines simultaneously. Considering users' convenience, it is desirable to make it possible to simultaneously eject both magazines contained in a two-tier manner.

In this respect, the objective of the present invention is to make it possible, in a library device capable of containing magazines in a two-tier manner, to simultaneously eject both two magazines by a simple mechanism with a reduced number of constituent parts.

Solution to Problem

A library device of the present invention is configured to comprise a magazine which can contain a plurality of cartridges each provided with a recording medium built-in therein, and a housing which can contain the magazine in a two-tier manner, wherein: the housing is provided, in its inside, with an accessor comprising a picker unit for holding a cartridge at the time of conveying the cartridge between a magazine and a drive device for writing data into and reading data from a cartridge, and comprising also a base unit for moving the picker unit in the direction of inserting and drawing a magazine and in the direction of tier arrangement; the magazine has a step member where a step is formed along the direction of insertion and drawing; the housing has a locking member comprising a stopper part, which is disposed between the magazine and the accessor in a rotatable manner and is positioned to abut the step of the step member, and a releasing part which is positioned in a moving area of the accessor in the direction of inserting and drawing the magazine, and the housing also comprises a biasing member for biasing the stopper part of the locking member in the direction of the step member; locking of the magazine is released by releasing the stopper part's abutting the step member of the magazine; and, in accordance with movement of the picker and base units in the direction of drawing the magazine and movement of the picker unit in the direction of magazine-tier arrangement, unlocking of the magazine contained in the upper tier, that of the magazine contained in the lower magazine, or that of both of the magazines contained respectively in the upper and lower tiers is performed.

Further, a library device of the present invention described above may be the library device, wherein release of the stopper part's abutting the step member of the magazine contained in the upper tier is performed by pressing the releasing part of the locking member comprising the stopper part with the picker unit, and release of the stopper part's abutting the step member of the magazine contained in the lower tier is performed by pressing the releasing part of the locking member comprising the stopper part with the base unit.

Further, a library device of the present invention described above may be the library device, wherein the abutting area of the stopper part abutting the step of the step member of the magazine contained in the upper tier may be smaller than the abutting area of the stopper part abutting the step of the step member of the magazine contained in the upper tier.

Further, a library device of the present invention described above may be the library device, wherein, in accordance with movement of the picker and base units in the direction of drawing the magazine and with movement of the picker unit in the direction of magazine-tier arrangement, the picker and base units each release abutting of the stopper part of the corresponding locking member to the corresponding step member.

Further, a library device of the present invention described above may be the library device, wherein, when the picker and base units have moved to a first position in the direction of drawing the magazine, the base unit presses the releasing part of the locking member disposed between the base unit and the step member of the magazine contained in the lower tier, and the picker unit presses the releasing part of the locking member disposed between the picker unit and the step member of the magazine contained in the upper tier, and thereby releases abutting of the stopper part of the locking member to the step member.

Further, a library device of the present invention described above may be the library device, wherein, when the picker and base units have moved to a second position in the direction of drawing the magazine, the picker unit presses the releasing part of the locking member disposed between the picker unit and the step member of the magazine contained in the upper tier, and thereby releases abutting of the stopper part of the locking member to the step member, and the base unit presses the releasing part of the locking member disposed between the base unit and the step member of the magazine contained in the lower tier, thereby releases abutting of the stopper part of the locking member to the step member.

Further, a library device of the present invention described above may be the library device, wherein, when the picker and base units have moved to a second position in the direction of drawing the magazine after the picker unit's moving to be at a lower position than the locking member disposed between the picker unit and the step member of the magazine contained in the upper tier, the base unit presses the releasing part of the locking member disposed between the base unit and the step member of the magazine contained in the lower tier, thereby releasing abutting of the stopper part of the locking member to the step member.

Advantageous Effects of Invention

According to the present invention, in a library device capable of containing magazines in a two-tier manner, it becomes possible to simultaneously ejection of both two magazines is possible in a simple mechanism with a reduced number of constituent parts.

BRIEF DESCRIPTION OF THE DRAWINGS

FIG. 3 a general view (side view) of an accessor according to the exemplary embodiment of the present invention.

FIG. 4 a diagram for illustrating a magazine-locking mechanism in the library device according to the exemplary embodiment of the present invention.

FIG. 5 a diagram for illustrating magazine-locking operation in the library device according to the exemplary embodiment of the present invention.

FIG. 6 a diagram for illustrating magazine-unlocking operation (for ejecting the upper-tier magazine) in the library device according to the exemplary embodiment of the present invention.

FIG. 7 a diagram for illustrating magazine-unlocking operation (for ejecting both magazines) in the library device according to the exemplary embodiment of the present invention.

FIG. 8 a diagram for illustrating magazine-unlocking operation (for ejecting the lower-tier magazine) in the library device according to the exemplary embodiment of the present invention.

DESCRIPTION OF EMBODIMENT

Exemplary Embodiment 1

Hereinafter, an exemplary embodiment of the present invention will be described with reference to drawings.

Figure 1:
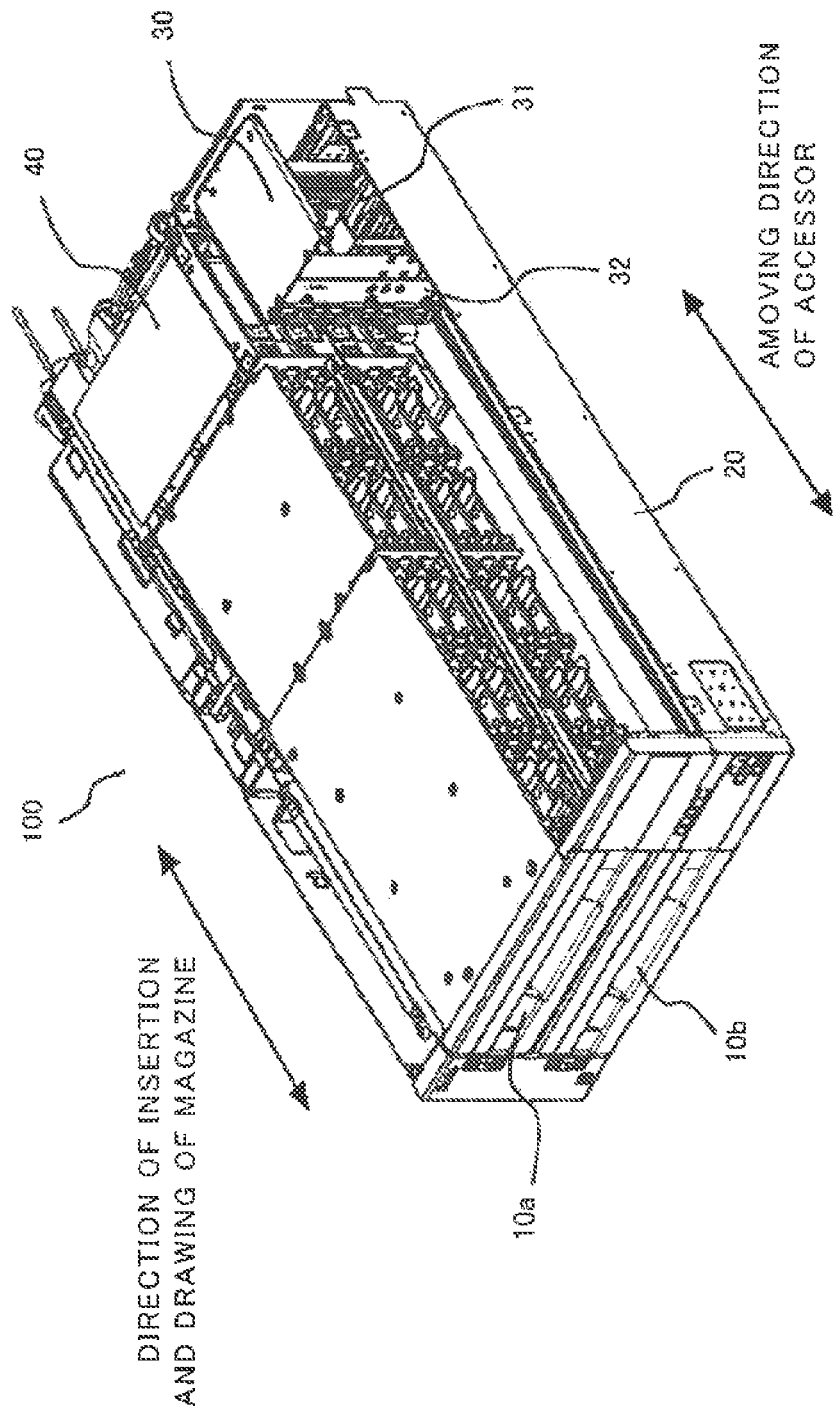
FIG. 1 a general view (perspective view) of a library device according to an exemplary embodiment of the present invention.

FIG. 1 is a general view (perspective view) showing a configuration of a library device according to the exemplary embodiment of the present invention. The library device 100 of the present exemplary embodiment is of a structure capable of containing magazines 10a and 10b in the device's main body 20, where the magazines are inserted in a two-tier manner. Each of the magazines 10a and 10b has a structure capable of containing a total of ten cartridges by arranging them into two tiers vertically and into five rows in the direction of inserting and drawing the cartridges. An accessor 30 is disposed at the side of an area for locating the magazines 10a and 10b and is capable of reciprocating movement along the direction of insertion and drawing of the magazines 10a and 10b.

The accessor 30 is configured to comprise a picker unit, which stores a cartridge into and extracts it from the magazines 10a and 10b and sets a cartridge to and removes it from a drive device 40, and a base unit 32 which performs movement of the picker unit 31 in between the drive device 40 and the magazines 10a and 10b. A moving range of the accessor 30 in its operation of releasing restraint on extraction of a magazine (hereafter, referred to as locking) is set to be an extension of its moving range in ordinary operation (extraction, conveyance and setting of a cartridge (with respect to the drive device 40), and extraction, conveyance and storage of a cartridge (with respect to the magazines 10a or 10b)). Operation of unlocking a magazine will be described later in detail. The accessor 30 performs extraction or storage of a cartridge or movement (conveyance of a cartridge) in accordance with a control signal inputted from a controller not illustrated in the drawing.

Figure 2:
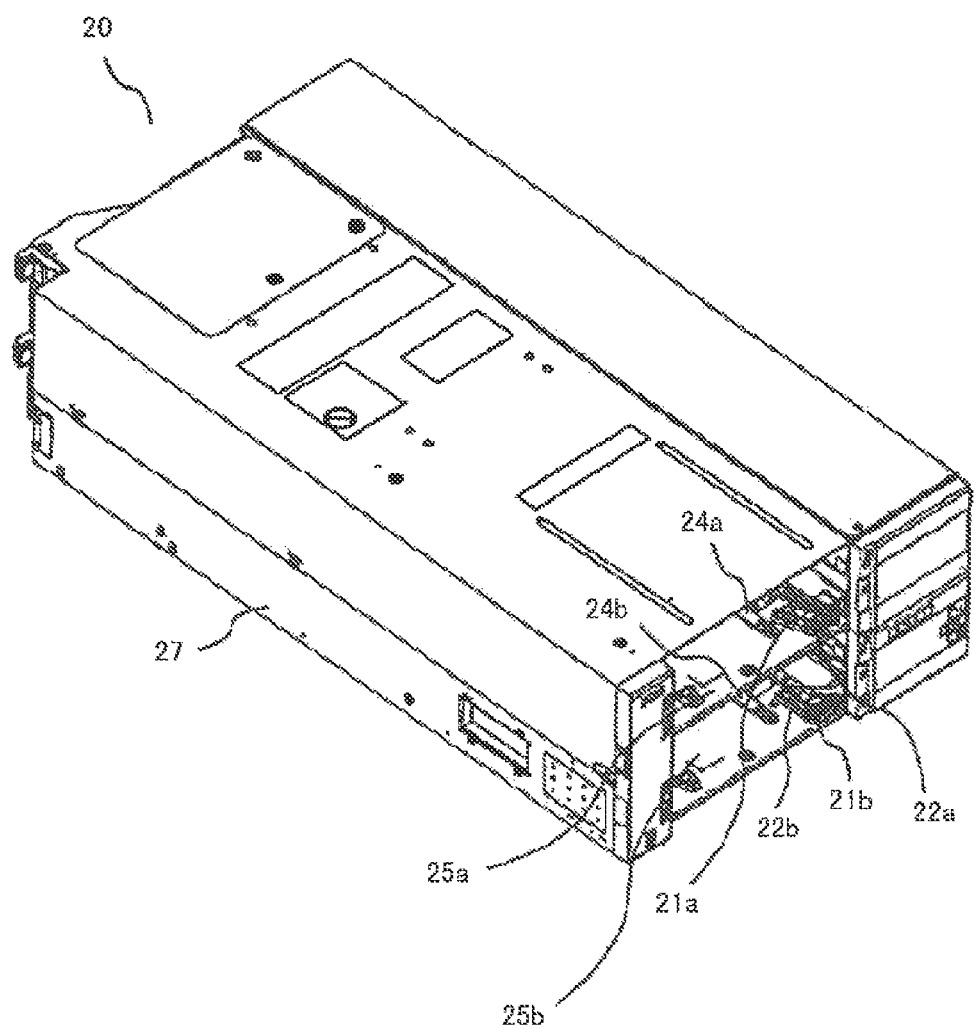
FIG. 2 a general view (perspective view) of a library device according to the exemplary embodiment of the present invention.

FIG. 2 shows a configuration of the device's main body 20 of the present exemplary embodiment. A locking lever 21a and a rail 24a are disposed in a magazine containment part 25a for containing the magazine 10a. The locking lever 21a is attached to a housing 27 (in the vicinity of an insertion slot of the magazine containment part 25a) via a fixed shaft 22a, and is rotatable in a plane approximately parallel to a surface of the housing 27. The locking lever 21a is arranged at a position where, in the state the magazine 10a is contained, its one end part (a stopper part 211a in FIG. 5) faces a part of the magazine 10 (the bottom surface 11a (described later)). The locking lever 21a is arranged also such that its other end part (a releasing part 212a in FIG. 5) is located on the track of the accessor 30, and it rotates around the fixed shaft 22a when torque is generated by the accessor 30 pressing it. Further, the locking lever 21a is provided with a spring not illustrated in the drawing, and its one end part (the stopper part 211a in FIG. 5) is thus biased toward a part of the magazine 10a (the bottom surface 11a (described later)). A magazine containment part 25b in the lower tier for containing the magazine 10b has the same configuration as that described above.

FIG. 3 shows a configuration of the accessor 30 of the present exemplary embodiment. If supposing the front surface of the accessor 30 to be parallel to a surface of the picker unit 31 by which the picker unit 31 faces the drive unit 40, FIG. 3 is a diagram where the accessor 30 is viewed from its lateral side (the moving direction of the accessor 30). The accessor 30 is configured, as described above, to comprise the picker unit 31 and the base unit 32. The base unit 32 has a predetermined driving means, supports the picker unit 31 and, in order to perform extraction, conveyance, setting and storage of a cartridge in between the drive device 40 and the magazines 10a and 10b, moves the picker unit 31 in both the direction of insertion and drawing of the magazines and the direction of magazine arrangement (a direction perpendicular to the former direction). That is, as shown in FIGS. 3(a) and (b), the base unit 32 moves the picker unit 31 also in the vertical direction.

In the present invention, the configuration is determined to be such that unlocking of the upper-tier magazine 10a is performed by the picker unit 31 and unlocking of the lower-tier magazine 10b by the base unit 32. As shown in FIG. 3, the picker unit 31 and the base unit 32 are provided with pressing parts 311 and 321, respectively, which press one end part of the locking levers 21a and 21b (the releasing parts 212a and 212b in FIG. 5), respectively, in the unlocking operation.

FIG. 4 shows the magazine 10b in a state of being contained in the housing 27. Here, illustrated is a state where the bottom surface 11b of the magazine 10b is viewed from underneath through the housing 27. In the bottom surface 11b of the magazine 10b, a step is formed with respect to the direction of its facing the base unit 32.

In the state the magazine 10b is fully contained in the housing. 27, as shown in FIG. 4(a), one end part of the locking lever 21b (the stopper part 211b in FIG. 5) is biased toward the magazine 10b by an elastic force of a spring 23b, and thus abuts the step portion of the bottom surace 11b. That is, in this state, drawing of the magazine 10b is restrained by the stopper part 211b (in FIG. 5) of the locking lever 21b and the step portion of the bottom surface 11b.

There, if the accessor 30 is moved by the base unit 32 in the direction of drawing the magazine, as shown in FIG. 4(b), the pressing part 321 of the base unit 32 presses the other end part of the locking lever 21b (the releasing part 212b in FIG. 5), and thereby attempts to rotate the locking lever 211b overcoming the elastic force of the spring 23b. Then, if the accessor 30 moves further in the direction of drawing the magazine, as shown in FIG. 4(c), the stopper part 211b of the locking lever 21b is released from the state of abutting the step portion, and the magazine 10b is thus unlocked and becomes able to be drawn.

Although FIG. 4 illustrates only the unlocking operation of the magazine 10b, it is the same for the magazine 10a contained in the upper tier in the housing 27. That is, the bottom surface 11a of the magazine 10a is provided with a step formed in its surface facing the base unit 32, and drawing the magazine 10a is thus restrained by the stopper part 211a of the locking lever 21a and the step portion of the bottom surface 11a. Then, caused by movement of the accessor 30 in the direction of drawing the magazine, the pressing part 311 of the picker unit 31 supported by the base unit 32 presses the releasing part 212a of the locking lever 21a and thus rotates the locking lever 21a, and the magazine 10a is thereby unlocked.

In the present invention, between the locking mechanism for the upper-tier magazine and that for the lower-tier one, given is a difference in an abutting area of the locking lever (its stopper part) to the step portion formed in the bottom surface of the magazine, and given thereby is a difference in a moving distance of the accessor (its pressing part) necessary to release the abutting state. Further, by configuring the picker unit to be able to move in the magazine arrangement direction (the vertical direction), it is made possible to intentionally determine not to perform unlocking of the upper-tier magazine. That is, the configuration is made such that which one of the magazine is to be unlocked can be controlled on the basis of movement of the accessor (its pressing part) in the direction of drawing the magazines and movement of the picker unit in the magazine arrangement direction (the vertical direction). It will be described below with reference to FIGS. 5 to 8.

FIG. 5 is a diagram for illustrating a state where both of the magazines are locked. In FIG. 5, a mechanism for locking and unlocking the upper-tier magazine 10a is shown in the upper region, and a mechanism for locking and unlocking the lower-tier magazine 10b is shown in the lower region. Each of the upper and lower diagrams is a diagram where the magazine's bottom surface 11a or 11b, the locking lever 21a or 21b, the fixed shaft 22a or 22b and the accessor (the picker unit 31 and the base unit 32) are viewed from above through intervening parts. It is the same in FIGS. 6 to 8.

In the state where both of the magazines are locked, in the upper tier, because the stopper portion 211a of the locking lever 21a is biased by the spring 23a not illustrated in the drawing, and thus abuts the step portion of the bottom surface 11a of the magazine 10a, and the pressing part 311 of the picker unit 31 does not press the releasing part 212a of the locking lever 21a, the locking state of the magazine 10a is maintained. Also in the lower tier, the locking state of the magazine 10b is similarly maintained.

FIG. 6 is a diagram for illustrating a case of unlocking and thus ejecting only the magazine contained in the upper tier. In the case of ejecting the upper-tier magazine, the accessor 30 (the picker unit 31 and the base unit 32) is moved to a predetermined position (a first position). As a result, in the upper tier, the pressing part 311 of the picker unit 31 presses the releasing part 212a of the locking lever 21a, and abutting of the stopper part 211a of the locking lever 21a to the step portion of the bottom surface of the magazine 10a is thus released, and the locking of the magazine 10a is thereby released.

On the other hand, in the lower tier, although the pressing part 321 of the base unit 32 presses the releasing part 212b of the locking lever 21b, abutting of the stopper part 211b of the locking lever 21b to the step portion of the bottom base 11b of the magazine 10b is not released, and the locking of the magazine 10b is not released but is maintained. This is because the end part of the stopper part 211b of the locking lever 21b is wider in width than that of the stopper part 211a of the locking lever 21a, and its abutting area to the step portion of the magazine's bottom surface is thus larger, and consequently, when the two locking levers 21a and 21b are moved by the same distance, only the stopper part 211a of the locking lever 21a having a narrower width is released from the state of abutting to the step portion of the magazine's bottom surface.

FIG. 7 is a diagram for illustrating a case of unlocking and thus ejecting both of the magazines. In the case of ejecting both of the magazines, the accessor 30 (the picker unit 31 and the base unit 32) is moved to a position (a second position) which is further in the direction of drawing the magazines than the first position. As a result, in the upper tier, the pressing part 311 of the picker unit 31 presses the releasing part 212a of the locking lever 21a, and abutting of the stopper part 211a of the locking lever 21a to the step portion of the bottom surface 11a of the magazine 10a is thus released, and the locking of the magazine 10a is thereby released. Also in the lower tier, the pressing part 321 of the base unit 32 presses the releasing part 212b of the locking lever 21b, and abutting of the stopper part 211b of the locking lever 21b to the step portion of the bottom surface 11b of the magazine 10b is thus released, and the locking of the magazine 10b also is thereby released.

FIG. 8 is a diagram for illustrating a case of unlocking and thus ejecting only the magazine contained in the lower tier. In the case of ejecting only the lower-tier magazine, first, the picker unit 31 is moved in the direction of the place where the lower-tier magazine 10b is located (a downward direction) (for example, it is moved such as to change from the state in FIG. 3(a) to that in FIG. 3(b)), and after that, the accessor 30 (the picker unit 31 and the base unit 32) is moved to the second position. Here, the purpose of moving the picker unit 31 in a downward direction before moving the accessor 30 (the picker unit 31 and the base unit 32) in the direction of drawing the magazines is to create a situation where unlocking by the picker unit 31 is impossible. If the movement of the accessor 30 (the picker unit 31 and the base unit 32) in the direction of drawing the magazines were performed first, both of the magazines are unlocked (similarly to in FIG. 7).

After the accessor 30 is moved to the second position subsequently to the downward movement of the picker unit 31 as described above, in the lower tier, the pressing part 321 of the base unit 32 presses the releasing part 212b of the locking lever 21b, and abutting of the stopper part 211b of the locking lever 21b to the step portion of the bottom surface 11b of the magazine 10b is thus released, and the locking of the magazine 10b is thereby released. On the other hand, in the upper tier, the pressing part 311 of the picker unit 31 never presses the releasing part 212a of the locking lever 21a, and the abutting state of the stopper part 211a of the locking lever 21a to the step portion of the bottom surface 11a of the magazine 10a is thus maintained, and the magazine 10a is thus kept locked.

In the present exemplary embodiment, because a difference in the abutting area of the stopper part of the locking lever to the step portion of the magazine's bottom surface is given by differentiating shapes of the stopper parts, it is possible to release only the locking mechanism for the upper-tier magazine 10a if the accesor 30 is moved to the first position, and to release also the locking mechanism for the lower-tier magazine 10b if the accesor 30 is moved to the second position, which is a position of further movement in the direction of drawing the magazines. If it is desired to release only the locking mechanism for the lower-tier magazine 10b, the picker unit 31 is moved downward and the accessor 30 is subsequently moved to the second position. In this way, operation of unlocking the magazines can be controlled in accordance with a difference in the abutting area of the stopper part of the locking lever to the step portion of the magazine's bottom surface, movement of the accessor 30 (the picker unit 31 and the base unit 32) in the direction of drawing the magazines, and movement of the picker unit 31 in the magazine arrangement direction.

The exemplary embodiment described above is a preferred exemplary embodiment of the present invention and does not limit the scope of the present invention to only the above-described exemplary embodiment, and therefore, the present invention can be implemented in embodiments where various changes are made within the range not departing from the spirit of the present invention.

For example, as a method of giving a difference in the abutting area of the stopper part of the locking lever to the step portion of the magazine's bottom surface, the locking levers with different stopper part shapes are employed respectively for the upper and lower tiers in the above-described exemplary embodiment, but it is also possible to configure the mechanism using locking levers with an identical shape. In that case, it is only necessary to arrange the identically shaped locking levers displacing their positions from each other so that they have different abutting areas.

Further, for example, as a mechanism of locking a magazine, in the present exemplary embodiment, the locking lever is arranged to be able to rotate in a plane parallel to the magazine's bottom surface, and the step is formed in the magazine's bottom surface with respect to the direction of facing the rotation direction of the locking lever, but it is also possible to configure the mechanism by shifting the positional relationship by 90 degrees. That is, the locking lever may be arranged to be able to rotate in a plane perpendicular to the magazine's bottom surface, and then the step may be formed in the magazine's bottom surface with respect to the direction of facing the rotation direction of the locking lever.

This application is based upon and claims the benefit of priority from Japanese Patent Application No. 2010-217896 proposed on Sep. 28, 2010, the disclosure of which is incorporated herein in its entirety by reference.

INDUSTRIAL APPLICABILITY

The present invention is applicable to the use of collecting information at a contact center in order for an operator to answer an inquiry.

REFERENCE SIGNS LIST 10 magazine
11 bottom surface
20 device's main body
21 locking lever
22 fixed shaft
23 spring
24 rail
25 magazine containment part
27 housing
30 accessor 31 picker unit
32 base unit
40 drive device
100 library device
211 stopper part
212 releasing part
311, 321 pressing part

The invention claimed is:

1. A library device configured to comprise a magazine which can contain a plurality of cartridges each provided with a recording medium built-in therein, and to comprise also a housing which can contain said magazine in a two-tier manner, wherein:

said housing is provided, in its inside, with an accessor comprising a picker unit for holding said cartridge at the time of conveying said cartridge between said magazine and a drive device for writing data into and reading data from said cartridge, and comprising also a base unit for moving said picker unit in the direction of insertion and drawing of said magazine and in the direction of tier arrangement;

said magazine has a step member where a step is formed along the direction of insertion and drawing;

said housing has a locking member comprising a stopper part, which is disposed between said magazine and said accessor in a rotatable manner and positioned to abut the step of said step member, and a releasing part which is positioned in a moving area of said accessor in the direction of insertion and drawing of said magazine, and said housing has also a biasing member for biasing said stopper part of said locking member in the direction of said step member;

locking of said magazine is released by releasing said stopper part's abutting said step member of said magazine; and, in accordance with movement of said picker and base units in the direction of drawing said magazine and movement of said picker unit in the direction of magazine-tier arrangement, unlocking of said magazine contained in the upper tier, that of said magazine contained in the lower tier or that of both of said magazines contained respectively in the upper and lower tiers is performed.

2. The library device according to claim 1, wherein release of said stopper part's abutting said step member of said magazine contained in the upper tier is performed by said picker unit's pressing said releasing part of said locking member comprising said stopper part, and release of said stopper part's abutting said step member of said magazine contained in the lower tier is performed by said base unit's pressing said releasing part of said locking member comprising said stopper part.

3. The library device according to claim 1 wherein the abutting area of said stopper part abutting the step of said step member of said magazine contained in the upper tier is smaller than the abutting area of said stopper part abutting the step of said step member of said magazine contained in the upper tier.

4. The library device according to claim 2, wherein the abutting area of said stopper part abutting the step of said step member of said magazine contained in the upper tier is smaller than the abutting area of said stopper part abutting the step of said step member of said magazine contained in the upper tier.

5. The library device according to claim 1, wherein, in accordance with movement of said picker and base units in the direction of drawing said magazine and movement of said picker unit in the direction of magazine-tier arrangement, said picker and base units release abutting of said stopper part of said locking member to said step member.

6. The library device according to claim 2, wherein, in accordance with movement of said picker and base units in the direction of drawing said magazine and movement of said picker unit in the direction of magazine-tier arrangement, said picker and base units release abutting of said stopper part of said locking member to said step member.

7. The library device according to claim 3, wherein, in accordance with movement of said picker and base units in the direction of drawing said magazine and movement of said picker unit in the direction of magazine-tier arrangement, said picker and base units release abutting of said stopper part of said locking member to said step member.

8. The library device according to claim 1, wherein, when said picker and base units have moved to a first position in the direction of drawing said magazine, said base unit presses said releasing part of said locking member disposed between said base unit and said step member of said magazine contained in the lower tier, and said picker unit presses said releasing part of said locking member disposed between said picker unit and said step member of said magazine contained in the upper tier, and thereby releases abutting of said stopper part of said locking member to said step member.

9. The library device according to claim 2, wherein, when said picker and base units have moved to a first position in the direction of drawing said magazine, said base unit presses said releasing part of said locking member disposed between said base unit and said step member of said magazine contained in the lower tier, and said picker unit presses said releasing part of said locking member disposed between said picker unit and said step member of said magazine contained in the upper tier, and thereby releases abutting of said stopper part of said locking member to said step member.

10. The library device according to claim 3, wherein, when said picker and base units have moved to a first position in the direction of drawing said magazine, said base unit presses said releasing part of said locking member disposed between said base unit and said step member of said magazine contained in the lower tier, and said picker unit presses said releasing part of said locking member disposed between said picker unit and said step member of said magazine contained in the upper tier, and thereby releases abutting of said stopper part of said locking member to said step member.

11. The library device according to claim 4, wherein, when said picker and base units have moved to a first position in the direction of drawing said magazine, said base unit presses said releasing part of said locking member disposed between said base unit and said step member of said magazine contained in the lower tier, and said picker unit presses said releasing part of said locking member disposed between said picker unit and said step member of said magazine contained in the upper tier, and thereby releases abutting of said stopper part of said locking member to said step member.

12. The library device according to claim 1, wherein, when said picker and base units have moved to a second position in the direction of drawing said magazine, said picker unit presses said releasing part of said locking member disposed between said picker unit and said step member of said magazine contained in the upper tier, thereby releasing abutting of said stopper part of said locking member to said step member, and said base unit presses said releasing part of said locking member disposed between said base unit and said step member of said magazine contained in the lower tier, thereby releasing abutting of said stopper part of said locking member to said step member.

13. The library device according to claim 2, wherein, when said picker and base units have moved to a second position in the direction of drawing said magazine, said picker unit presses said releasing part of said locking member disposed between said picker unit and said step member of said magazine contained in the upper tier, thereby releasing abutting of said stopper part of said locking member to said step member, and said base unit presses said releasing part of said locking member disposed between said base unit and said step member of said magazine contained in the lower tier, thereby releasing abutting of said stopper part of said locking member to said step member.

14. The library device according to claim 3, wherein, when said picker and base units have moved to a second position in the direction of drawing said magazine, said picker unit presses said releasing part of said locking member disposed between said picker unit and said step member of said magazine contained in the upper tier, thereby releasing abutting of said stopper part of said locking member to said step member, and said base unit presses said releasing part of said locking member disposed between said base unit and said step member of said magazine contained in the lower tier, thereby releasing abutting of said stopper part of said locking member to said step member.

15. The library device according to claim 4, wherein, when said picker and base units have moved to a second position in the direction of drawing said magazine, said picker unit presses said releasing part of said locking member disposed between said picker unit and said step member of said magazine contained in the upper tier, thereby releasing abutting of said stopper part of said locking member to said step member, and said base unit presses said releasing part of said locking member disposed between said base unit and said step member of said magazine contained in the lower tier, thereby releasing abutting of said stopper part of said locking member to said step member.

16. The library device according to claim 5, wherein, when said picker and base units have moved to a second position in the direction of drawing said magazine, said picker unit presses said releasing part of said locking member disposed between said picker unit and said step member of said magazine contained in the upper tier, thereby releasing abutting of said stopper part of said locking member to said step member, and said base unit presses said releasing part of said locking member disposed between said base unit and said step member of said magazine contained in the lower tier, thereby releasing abutting of said stopper part of said locking member to said step member.

17. The library device according to claim 1, wherein, when said picker and base units have moved to a second position in the direction of drawing said magazine after said picker unit's moving to be at a lower position than said locking member disposed between said picker unit and said step member of said magazine contained in the upper tier, said base unit presses said releasing part of said locking member disposed between said base unit and said step member of said magazine contained in the lower tier, thereby releasing abutting of said stopper part of said locking member to said step member.

18. The library device according to claim 2, wherein, when said picker and base units have moved to a second position in the direction of drawing said magazine after said picker unit's moving to be at a lower position than said locking member disposed between said picker unit and said step member of said magazine contained in the upper tier, said base unit presses said releasing part of said locking member disposed between said base unit and said step member of said magazine contained in the lower tier, thereby releasing abutting of said stopper part of said locking member to said step member.

19. The library device according to claim 3, wherein, when said picker and base units have moved to a second position in the direction of drawing said magazine after said picker unit's moving to be at a lower position than said locking member disposed between said picker unit and said step member of said magazine contained in the upper tier, said base unit presses said releasing part of said locking member disposed between said base unit and said step member of said magazine contained in the lower tier, thereby releasing abutting of said stopper part of said locking member to said step member.

20. The library device according to claim 4, wherein, when said picker and base units have moved to a second position in the direction of drawing said magazine after said picker unit's moving to be at a lower position than said locking member disposed between said picker unit and said step member of said magazine contained in the upper tier, said base unit presses said releasing part of said locking member disposed between said base unit and said step member of said magazine contained in the lower tier, thereby releasing abutting of said stopper part of said locking member to said step member.

* * * * *